(12) United States Patent
Okano et al.

(10) Patent No.: US 9,204,691 B2
(45) Date of Patent: Dec. 8, 2015

(54) TONGUE AND SEAT BELT DEVICE USING THE SAME

(71) Applicant: Takata Corporation, Tokyo (JP)

(72) Inventors: Motonori Okano, Tokyo (JP); Yuuki Tabata, Tokyo (JP); Yoshihiko Kawai, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/380,349

(22) PCT Filed: Feb. 14, 2013

(86) PCT No.: PCT/JP2013/053535
§ 371 (c)(1),
(2) Date: Aug. 21, 2014

(87) PCT Pub. No.: WO2013/125442
PCT Pub. Date: Aug. 29, 2013

(65) Prior Publication Data
US 2015/0021896 A1  Jan. 22, 2015

(30) Foreign Application Priority Data

Feb. 24, 2012 (JP) ................................. 2012-038616

(51) Int. Cl.
| | |
|---|---|
| *A44B 11/25* | (2006.01) |
| *B60R 22/18* | (2006.01) |
| *B60R 22/12* | (2006.01) |
| *B60R 22/34* | (2006.01) |

(52) U.S. Cl.
CPC ......... *A44B 11/2503* (2013.01); *A44B 11/2553* (2013.01); *A44B 11/2561* (2013.01); *B60R 22/12* (2013.01); *B60R 22/18* (2013.01); *B60R 22/34* (2013.01); *B60R 2022/1812* (2013.01)

(58) Field of Classification Search
CPC ........... B60R 22/12; B60R 2022/1812; A44B 11/2503; A44B 11/2553; A44B 11/2561

USPC .............. 280/807, 801.1; 24/467, 571, 572.1, 24/593
See application file for complete search history.

(56) References Cited

U.S. PATENT DOCUMENTS

| | | | |
|---|---|---|---|
| 6,138,328 A | 10/2000 | Iseki | |
| 6,543,101 B2 * | 4/2003 | Sack et al. | ........................ 24/633 |

(Continued)

FOREIGN PATENT DOCUMENTS

| | | |
|---|---|---|
| EP | 2 621 304 A | 8/2013 |
| EP | 2 779 856 A | 9/2014 |

(Continued)

OTHER PUBLICATIONS

International Search Report dated May 28, 2013 issued in connection with International Application No. PCT/JP2013/053535.

(Continued)

*Primary Examiner* — Paul N Dickson
*Assistant Examiner* — Darlene P Condra
(74) *Attorney, Agent, or Firm* — Foley & Lardner LLP

(57) ABSTRACT

[Object] Smooth sliding against a seat belt is allowed in a normal state, and effectiveness of suppressing extension of a lap belt is increased in an emergency state.
[Solution] A seat belt slide portion 17 has a recess portion 20 provided in a seat belt slide surface 18 and a specified number of projections 27 provided in the recess portion 20. The seat belt slide surface 18 has a shoulder belt-side seat belt slide surface 22 that is disposed on a shoulder belt 9 side and extends in a longitudinal direction of a seat belt insertion hole 16. Relative to a position where the distance in a direction perpendicular to or substantially perpendicular to the longitudinal direction of the seat belt insertion hole 16 is a minimum, the shoulder belt-side seat belt slide surface 22 extends from the shoulder belt 9 side to a lap belt 10 side, and the distance of a part 22a of the shoulder belt-side seat belt slide surface 22 is positioned on the lap belt 10 side relative to the position of a virtual line α.

9 Claims, 4 Drawing Sheets

(56) References Cited

U.S. PATENT DOCUMENTS

| | | | |
|---|---|---|---|
| 7,996,964 B2* | 8/2011 | Wendt et al. | 24/593.1 |
| 2011/0107581 A1 | 5/2011 | Heym et al. | |
| 2013/0154335 A1* | 6/2013 | Tabata et al. | 297/474 |
| 2013/0341994 A1* | 12/2013 | Boughner et al. | 297/468 |

FOREIGN PATENT DOCUMENTS

| | | | |
|---|---|---|---|
| JP | 2000-153751 A | 6/2000 | |
| JP | 2009-166586 A | 7/2009 | |
| JP | 2012-071640 A | 4/2012 | |
| WO | WO 2009043837 A1 * | 4/2009 | |
| WO | WO-2011/064593 A1 | 6/2011 | |
| WO | WO-2012/042394 A2 | 4/2012 | |
| WO | WO-2013/071927 A1 | 5/2013 | |

OTHER PUBLICATIONS

Supplementary European Search Report dated Jul. 21, 2015 issued in European Application No. 13751381.8.

* cited by examiner

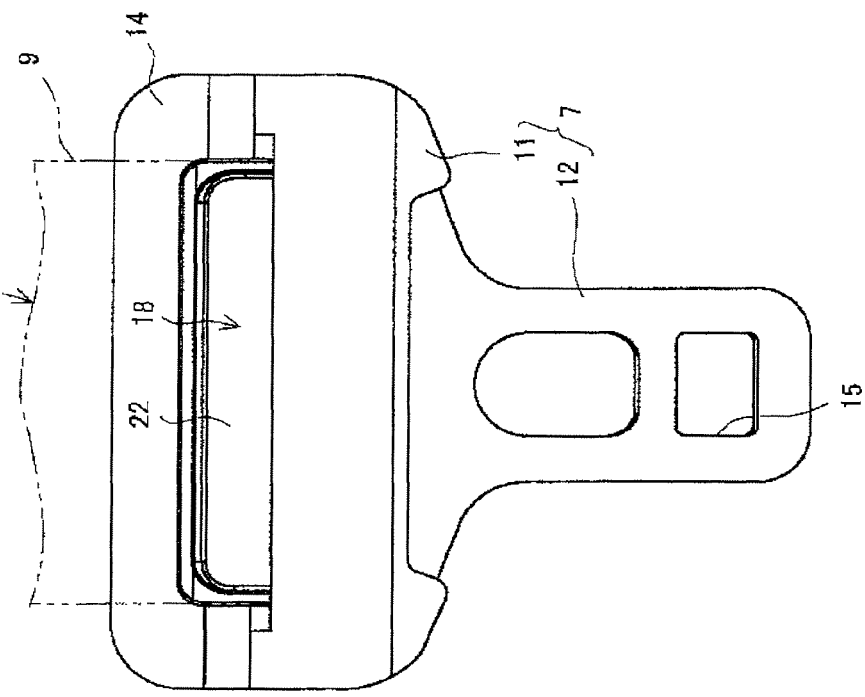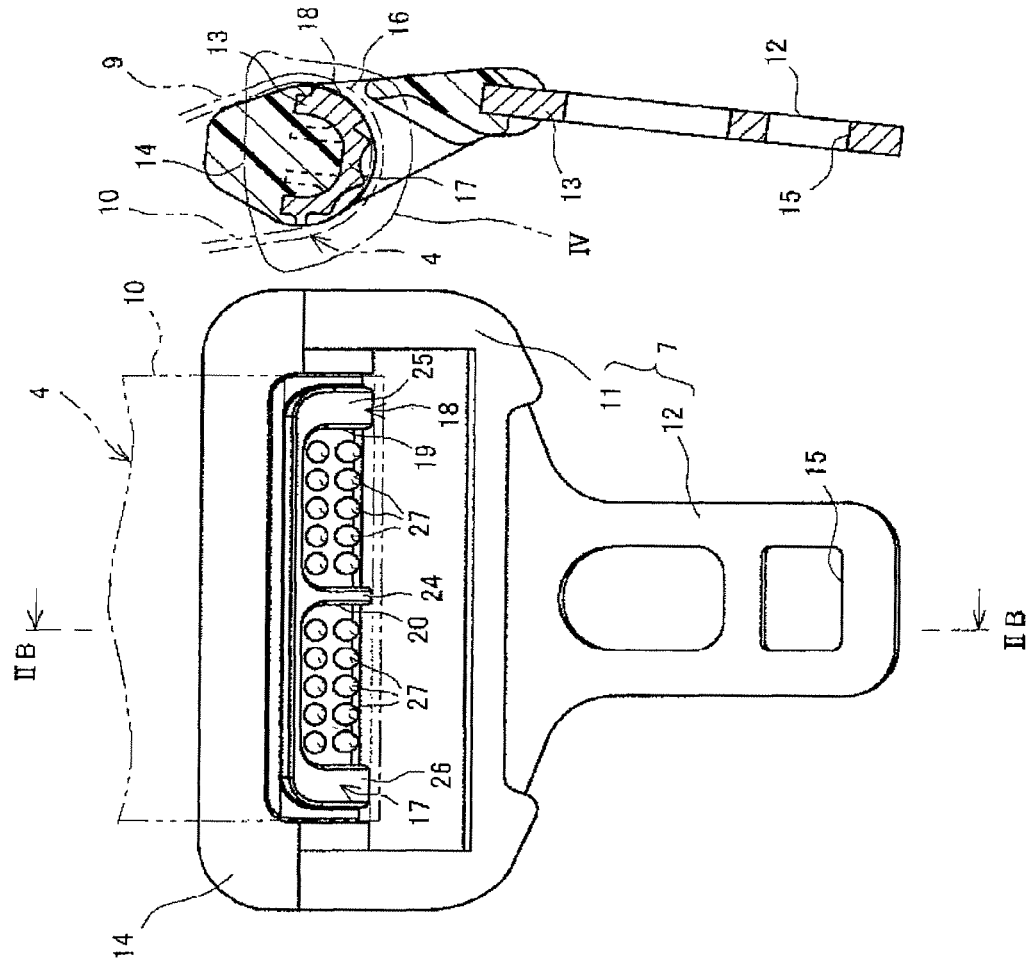

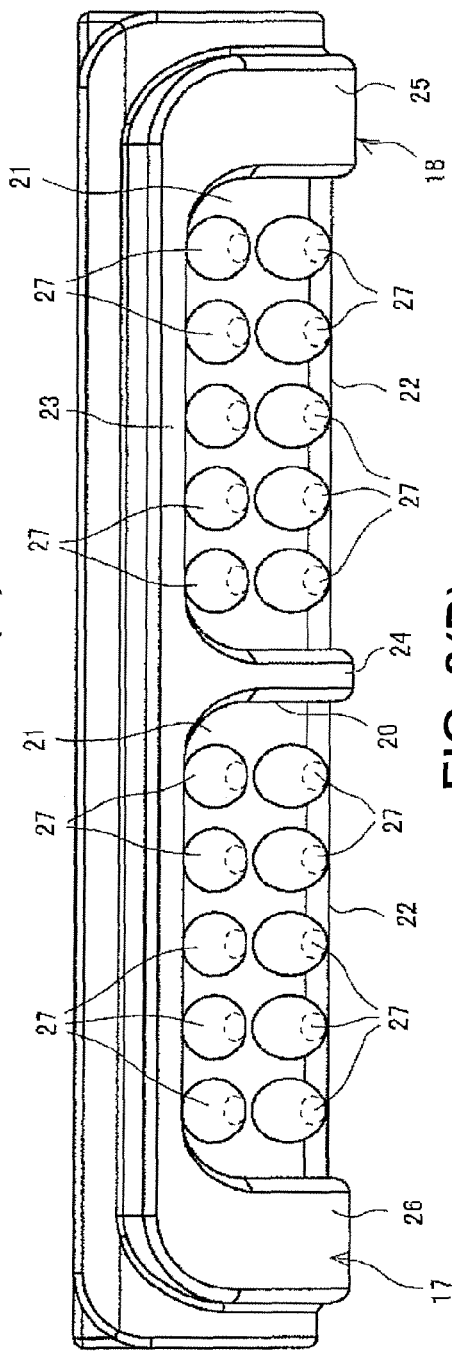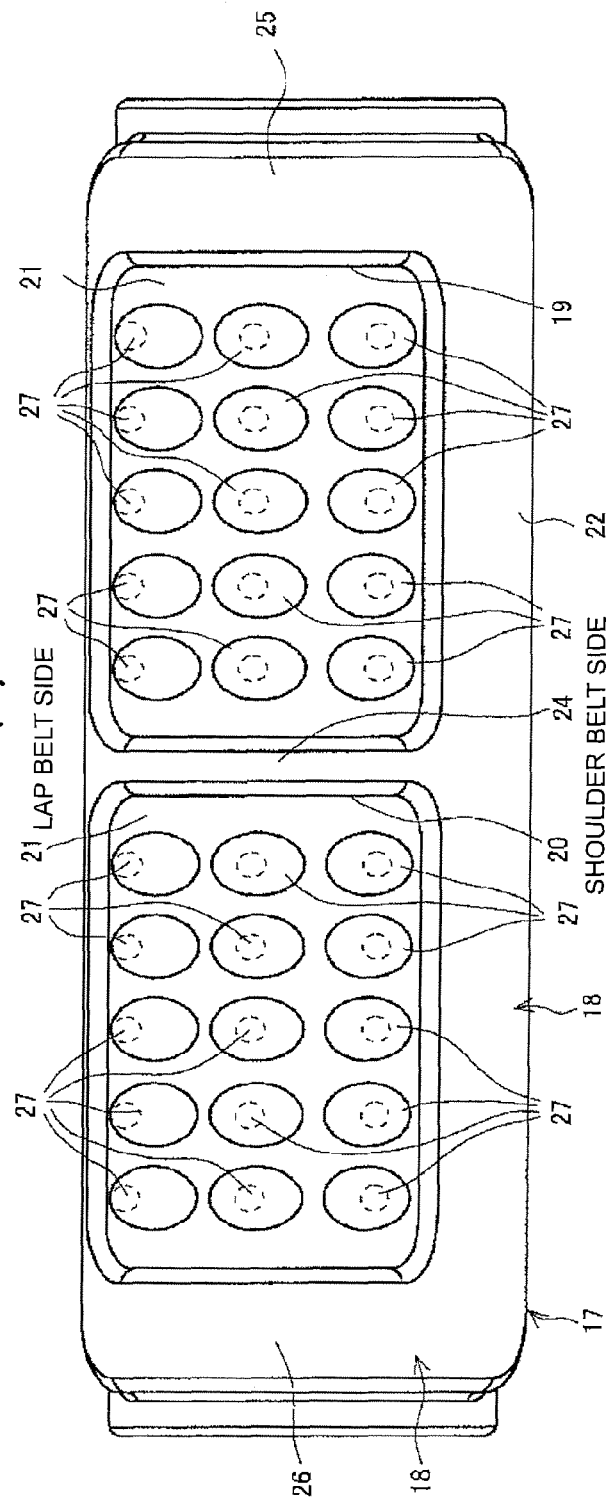

TONGUE AND SEAT BELT DEVICE USING THE SAME

TECHNICAL FIELD

The present invention relates to technical fields of a tongue, which is used for a seat belt device, slidably supported by a seat belt, and engaged with a buckle secured to a vehicle body or the like, and the seat belt device using the tongue.

BACKGROUND ART

Conventionally, in an emergency state in which a far larger deceleration than that in a normal state is applied to a vehicle in a vehicle collision or the like (simply referred to as an emergency state hereafter), a seat belt device attached to a vehicle seat of an automobile or the like restrains the occupant with a seat belt. Generally, a three-point seat belt device is widely known and used as such a seat belt device. In the known general three-point seat belt device, the seat belt withdrawn from the seat belt retractor is guided by the belt guide anchor, and the tip end of the seat belt is secured to a vehicle body. A tongue is slidably supported by the seat belt guided by the belt guide anchor. In this case, the seat belt is slidably inserted through an elongated seat belt insertion hole of the tongue. When the tongue is engaged with the buckle, which is secured to the vehicle body, the seat belt is worn by the occupant.

When the seat belt is worn by the occupant, part of the seat belt between the belt guide anchor and the tongue functions as a shoulder belt worn on the shoulder and the breast of the occupant. Another part of the seat belt between an end secured to the vehicle body and the tongue functions as a lap belt worn on the lap of the occupant. In the above-described emergency state, a lock mechanism of the seat belt retractor operates so as to inhibit the withdrawal of the seat belt. Thus, the shoulder and the breast of the occupant are restrained by the shoulder belt and the lap of the occupant is restrained by the lap belt.

Generally in such a seat belt device, even when the lock mechanism of the seat belt retractor operates and the withdrawal of the seat belt is inhibited in the emergency state, the lap belt may slightly extend due to an inertial force of the occupant. Accordingly, it is unlikely that the lap belt effectively restrains the occupant.

In order to address this, the following tongue has been proposed: that is, in a normal operation state of the seat belt, friction between the seat belt and a seat belt slide surface of the tongue is decreased so as to allow the seat belt to smoothly slide against the tongue; and in the emergency state, the friction between the seat belt and the seat belt slide surface is increased so that the seat belt is unlikely to move to the lap belt side (see, for example, Patent Literature 1).

In the tongue described in Patent Literature 1, many axial-direction grooves and many circumferential-direction grooves are provided in the seat belt slide surface of the seat belt insertion hole of the tongue. The axial-direction grooves substantially linearly extend in a longitudinal direction of a seat belt insertion hole. The circumferential-direction grooves extend in a direction substantially perpendicular to the longitudinal direction of the seat belt insertion hole. In this case, the axial-direction grooves and the circumferential-direction grooves are provided entirely in the longitudinal direction of the seat belt slide surface of the elongated seat belt insertion hole. In the normal operation state of the seat belt, the seat belt slides practically against the tip ends of projections formed by the axial-direction grooves and the circumferential-direction grooves. Thus, the friction between the seat belt and the seat belt slide surface of the tongue is reduced. Thus, in the normal operation state of the seat belt, the seat belt smoothly slides against the tongue. In the emergency state, the seat belt is pulled by the inertial force of the occupant on both sides of the tongue. Thus, tension of the seat belt is increased. As a result, the seat belt is pressed into the axial-direction grooves and the circumferential-direction grooves by the increasing tension. Accordingly, the friction between the seat belt and the seat belt slide surface is increased. Thus, in the emergency state, the seat belt is unlikely to move to the lap belt side, and accordingly, extension of the lap belt is suppressed. By suppressing the extension of the lap belt in the emergency state as described above, the performance of the lap belt for restraining the occupant is improved.

Also according to Patent Literature 1, a plurality of ribs, which substantially linearly extend in the longitudinal direction of the seat belt insertion hole, is provided in the seat belt slide surface so as to project from the seat belt slide surface and to be spaced apart from one another by specified intervals in the circumferential direction. Patent Literature 1 discloses that, because of these ribs, the friction between the seat belt and the seat belt slide surface varies between the normal operation state of the seat belt and the emergency state. In this case, the friction between the seat belt and the seat belt slide surface is reduced by causing the seat belt to slide against only the surfaces of the ribs in the normal operation state of the seat belt. In the emergency state, the ribs are pressed to the lap belt side by the increasing tension of the seat belt, and the seat belt also slides against the surfaces of other parts of the seat belt slide surface. Thus, the friction between the seat belt and the seat belt slide surface is increased.

Also, Patent Literature 1 discloses that a plurality of resin members are provided on the seat belt slide surface so as to project from the seat belt slide surface. The resin members cause the friction between the seat belt and the seat belt slide surface to vary between the normal operation state of the seat belt and the emergency state. In this case, in the normal operation state of the seat belt, the seat belt slides against only the surfaces of the resin members. Thus, the friction between the seat belt and the seat belt slide surface is reduced. In the emergency state, the resin members are crushed or cut by the increasing tension of the seat belt, and accordingly, the seat belt slides against the surfaces of other parts of the seat belt slide surface. Thus, the friction between the seat belt and the seat belt slide surface is increased.

CITATION LIST

Patent Literature

PTL 1: Japanese Unexamined Patent Application Publication No. 2009-166586

SUMMARY OF INVENTION

Technical Problem

In the tongue described in Patent Literature 1, the axial-direction grooves that significantly contribute to the friction between the seat belt and the seat belt slide surface substantially linearly extend in the longitudinal direction of the seat belt insertion hole in the seat belt slide surface. For this reason, when tension of the seat belt is increased in the emergency state, it is unlikely that the seat belt is effectively pressed into the substantially linear axial-direction grooves.

Accordingly, with these axial-direction grooves, it is unlikely that, in the emergency state, a large friction is effectively obtained between the seat belt and the seat belt slide surface.

Furthermore, similarly to the above-described axial-direction grooves, the ribs substantially linearly extend entirely in the longitudinal direction of the seat belt insertion hole on the seat belt slide surface. For this reason, when the tension of the seat belt is increased in the emergency state, it is unlikely that the ribs are effectively pressed into the seat belt. Accordingly, with these ribs, it is also unlikely that, in the emergency state, a large friction is effectively obtained between the seat belt and the seat belt slide surface. In addition, in the emergency state, ribs are pressed and the seat belt is only brought into contact with the usual seat belt slide surface. Thus, it is unlikely that the effectiveness of obtaining a large friction between the seat belt and the seat belt slide surface is increased. Furthermore, the resin members that project from the seat belt slide surface are formed so as to be only crushed or cut in the emergency state. Accordingly, in the emergency state, the resin members are also only crushed or cut and the seat belt is only brought into contact with the usual seat belt slide surface. Thus, it is unlikely that the effectiveness of obtaining a large friction between the seat belt and the seat belt slide surface is increased. Thus, with the tongue described in Patent Literature 1, although a certain effect of suppressing the extension of the lap belt can be obtained in the emergency state, it is possible that the extension of the lap belt in the emergency state is more effectively suppressed.

It is required that, even when the seat belt is pressed into the axial-direction grooves or the ribs are pressed into the seat belt by the increased tension of the seat belt in the emergency state, the strength of the seat belt be maintained so as to support the increased tension.

Furthermore, in the normal operation state of the seat belt, it is desired that the seat belt be unlikely to be twisted when the seat belt is inserted through the elongated seat belt insertion hole of the tongue so that the friction between the seat belt and the seat belt slide surface is reduced.

The present invention is proposed in view of the above-described situation. An object of the present invention is to provide a tongue, with which the performance of a seat belt for restraining the occupant and the operability of the seat belt can be further improved by, in the normal state, permitting the tongue to slide against the seat belt as smoothly as possible, and by, in the emergency state, increasing the effectiveness of suppressing extension of lap belt and allowing the strength of the seat belt to be maintained. It is also an object of the present invention to provide a seat belt device that uses this tongue.

Solution to Problem

In order to address the above-described problem, a tongue according to the present invention, which is slidably supported by a seat belt, separates the seat belt into a shoulder belt and a lap belt, and has an engagement portion engageable with a buckle, has a seat belt insertion hole that is provided so as to be elongated in a direction perpendicular to or substantially perpendicular to the engagement portion and allows the seat belt to be inserted therethrough. The tongue also has a seat belt slide portion that forms part of the seat belt insertion hole and has a seat belt slide surface against which the seat belt slides. In the tongue, the seat belt slide portion has a specified number of recess portions in the seat belt slide surface. A cross section, which is perpendicular to or substantially perpendicular to a longitudinal direction of the seat belt insertion hole, of an outer circumferential surface of each of the recess portions has an arc shape. In the tongue, the seat belt slide portion also has a specified number of projections separately provided in the recess portions. The seat belt slide surface at least has a shoulder belt-side seat belt slide surface that is disposed on a shoulder belt side and extends in the longitudinal direction of the seat belt insertion hole. In the tongue, relative to a position where the distance in a direction perpendicular to or substantially perpendicular to the longitudinal direction of the seat belt insertion hole is a minimum, the shoulder belt-side seat belt slide surface extends from the shoulder belt side to a lap belt side, and part of the shoulder belt-side seat belt slide surface is positioned on the lap belt side relative to the position where the distance is the minimum.

Furthermore, in the tongue according to the present invention, the seat belt slide surface has a lap belt-side seat belt slide surface that is disposed on the lap belt side and extends in the longitudinal direction of the seat belt insertion hole.

Furthermore, in the tongue according to the present invention, the seat belt slide surface has a first and second-end seat belt slide surfaces that are disposed at both end portions in the longitudinal direction of the seat belt insertion hole and extend in the direction perpendicular to or substantially perpendicular to the longitudinal direction of the seat belt insertion hole.

Furthermore, in the tongue according to the present invention, a plurality of the recess portions are provided, and the seat belt slide surface has an intermediate seat belt slide surface that is disposed between the plurality of recess portions and extends in the direction perpendicular to or substantially perpendicular to the longitudinal direction of the seat belt insertion hole.

Furthermore, in the tongue according to the present invention, the projections do not project further to an outside than the seat belt slide surface from the recess portions.

A seat belt device according to the present invention at least includes a seat belt, a seat belt retractor that retracts the seat belt, a tongue slidably supported by the seat belt, and a buckle, into which the tongue is inserted and with which the tongue is engaged. In the seat belt device, the seat belt is worn by an occupant when the tongue is inserted into and engaged with the buckle. In the seat belt device, the tongue is any one of the tongues according the above-described present invention.

Advantageous Effects of Invention

In the tongue according to the present invention having the above-described configuration, a specified number of recess portions are provided in the seat belt slide surface, and a specified number of projections are provided in the recess portions. Thus, the tension applied to the seat belt in the normal state is small, and accordingly, the seat belt slides practically against the seat belt slide surface at this time. This permits the seat belt to smoothly slide against the tongue. As a result, operability of the seat belt in the normal state can be effectively improved. Furthermore, the tension applied to the seat belt is significantly increased in the emergency state. In this state, the seat belt is moved into the recess portions, and the projections are pushed into the seat belt. Thus, when the seat belt attempts to extend to the lap belt side, the movement of the seat belt to the lap belt side can be effectively suppressed by the gripping force (frictional force) applied by the projections to the seat belt. As a result, extension of the lap belt in the emergency state is effectively suppressed, and accordingly, the effectiveness of restraint of the occupant with the lap belt can be increased.

In particular, the cross section, which is perpendicular to or substantially perpendicular to the longitudinal direction of the seat belt insertion hole, of the outer circumferential surface of each of the recess portions provided in the seat belt slide surface has an arc shape. In the normal state, this can increase the effectiveness of facilitating smooth sliding of the seat belt against the tongue, and in the emergency state, the effectiveness of restraint of the occupant with the lap belt can be increased.

Furthermore, relative to the position where the distance in the direction perpendicular to or substantially perpendicular to the longitudinal direction of the seat belt insertion hole is a minimum, the shoulder belt-side seat belt slide surface disposed in the longitudinal direction of the seat belt insertion hole extends from the shoulder belt side to the lap belt side, and the part of the shoulder belt-side seat belt slide surface is positioned on the lap belt side relative to the above-described position where the distance is the minimum. Thus, even with the recess portions provided in the seat belt slide surface, the seat belt can pass through the smooth minimum width part of the seat belt insertion hole where the recess portions are not provided. Thus, inversion of the seat belt is suppressed and the seat belt can be held in a state in which the seat belt is not twisted. This permits the seat belt to easily and smoothly slide against the tongue in the normal state, and accordingly, operability of the seat belt in the normal state can be further improved.

Furthermore, the seat belt slide surface has the first and second-end seat belt slide surfaces that are disposed at both the end portions in the longitudinal direction of the seat belt insertion hole and extend in the direction perpendicular to or substantially perpendicular to the longitudinal direction of the seat belt insertion hole. Furthermore, the seat belt slide surface has the plurality of recess portions and the intermediate seat belt slide surface that is disposed between the plurality of recess portions and extends in the direction perpendicular or substantially perpendicular to the longitudinal direction of the seat belt insertion hole. This permits the seat belt to easily and smoothly slide against the tongue in the normal state, and accordingly, operability of the seat belt in the normal state can be further improved.

Also, the projections do not project further to the outside than the seat belt slide surface from the recess portions. Thus, in the normal state, the seat belt, which is not in contact with the projections or is in contact with the projections with a small force applied thereto, slides practically against the seat belt slide surface. This can increase the effectiveness of facilitating smooth sliding of the seat belt against the tongue. Furthermore, in the emergency state, the seat belt is moved into the recess portions, and accordingly, the projections are pushed into the seat belt. Thus, when the seat belt attempts to extend to the lap belt side, the movement of the seat belt to the lap belt side can be effectively suppressed by the gripping force (frictional force) applied by the projections to the seat belt. Thus, extension of the lap belt in the emergency state is effectively suppressed, and accordingly, the effectiveness of the restraint of the occupant with the lap belt can be increased.

Furthermore, since the tip ends of the projections have a spherical shape, the seat belt can have a strength, with which comparatively larger forces applied to the seat belt from the projections in the emergency state can be support.

In the seat belt device of the present example that uses the tongue according to the present invention, the seat belt can be smoothly and easily slide against the tongue in the normal state, and extension of the lap belt in the emergency state can be effectively suppressed. Furthermore, the strength of the seat belt can be maintained at the strength with which the forces applied from the projections in the emergency state can be supported. Thus, both the wearing property of the seat belt for the occupant and the performance of the seat belt for restraining the occupant can be further improved.

BRIEF DESCRIPTION OF DRAWINGS

FIG. 1 is a schematic view illustrating an example of an embodiment of a seat belt device according to the present invention.

[FIG. 2] View (A) is a front view illustrating an example of an embodiment of a tongue according to the present invention used in the seat belt device of the example illustrated in FIG. 1, view (B) is a sectional view taken along line IIB-IIB in view (A) of FIG. 2, and view (C) is a rear view of the tongue illustrated in view (A).

[FIG. 3] View (A) is a front view of a seat belt slide portion of the tongue of the example illustrated in FIG. 2, and view (B) is a bottom view of the seat belt slide portion illustrated in view (A).

FIG. 4 is an enlarged sectional view of part IV in view (B) of FIG. 2.

REFERENCE SIGNS LIST 1 seat belt device, 3 seat belt retractor, 4 seat belt, 7 tongue, 8 buckle, 9 shoulder belt, 10 lap belt, 11 grip portion, 12 engagement portion, 13 metal plate, 14 resin molded portion, 15 engagement hole, 16 seat belt insertion hole, 16a,16b side edge of seat belt insertion hole, 17 seat belt slide portion, 18 seat belt slide surface, 19 first recess portion, 20 second recess portion, 22 shoulder belt-side seat belt slide surface, 23 lap belt-side seat belt slide surface, 24 intermediate seat belt slide surface, 25 first-end seat belt slide surface, 26 second-end seat belt slide surface, 27 projections

DESCRIPTION OF EMBODIMENTS

An embodiment of the present invention will be described below with reference to the drawings.

Figure 1:
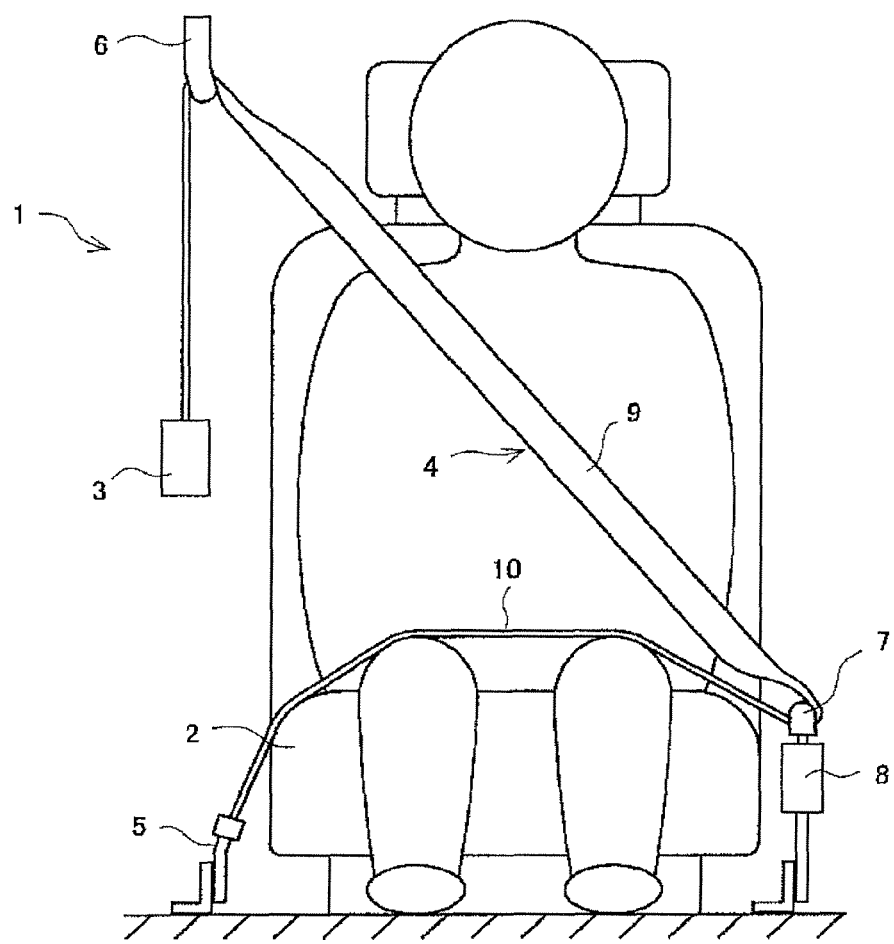
[FIG. 1]

FIG. 1 is a schematic view illustrating an example of an embodiment of a seat belt device according to the present invention.

As illustrated in FIG. 1, the seat belt device of the present example is basically the same as a known three-point seat belt device. In the drawing, reference sign 1 denotes a seat belt device, reference sign 2 denotes a vehicle seat, reference sign 3 denotes a seat belt retractor, reference sign 4 denotes a seat belt, reference sign 6 denotes a belt guide anchor, reference sign 7 denotes a tongue, and a reference sign 8 denotes a buckle. The seat belt retractor 3 is disposed in a vehicle body near the vehicle seat 2. The seat belt 4 is retracted by the seat belt retractor 3 such that the seat belt 4 is withdrawable from the seat belt retractor 3, and a belt anchor 5 provided at a tip end of the seat belt 4 is secured to a floor of the vehicle body or the vehicle seat 2. The belt guide anchor 6 guides the seat belt 4 withdrawn from the seat belt retractor 3 toward the shoulder of the occupant. The tongue 7 is slidably supported by the seat belt 4 guided from the belt guide anchor. The buckle 8, into which the tongue 7 is inserted and with which the tongue 7 is disengageably engaged, is secured to the floor of the vehicle body or the vehicle seat 2. Wearing and releasing operations of the seat belt 4 of the seat belt device 1 is also the same as those of the known seat belt device.

When the seat belt 3 is not worn, the tongue 7 is not engaged with the buckle 8, and the entire length of the seat belt 4 (specifically, the length of the seat belt 4 by which the seat belt 4 can be retracted by the seat belt retractor 3 without a problem) is retracted by the seat belt retractor 3. In order for the occupant to wear the seat belt 4, as illustrated in FIG. 1, the seat belt 4 is withdrawn from the seat belt retractor 3 by a specified length. Then the tongue 7 is brought into engagement with the buckle 8 and slack of the seat belt 4 is removed. Thus, the seat belt 4 is worn by the occupant.

When the seat belt 4 is worn by the occupant, in a normal state in which the vehicle is not subjected to a far larger deceleration than that applied to a normally running vehicle, the seat belt 4 is arbitrarily withdrawable at a normal belt withdrawing speed. Also at this time, when releasing the hand from the seat belt 4, the seat belt 4 is retracted by the seat belt retractor 3 by the length the seat belt 4 has been excessively withdrawn. In this case, part of the seat belt 4 between the belt guide anchor 6 and the tongue 7 is a shoulder belt 9 that restrains the shoulder and the breast of the occupant, and part of the seat belt 4 between the belt anchor 5 and the tongue 7 is a lap belt 10 that restrains the lap and the legs of the occupant.

When the seat belt 4 is worn by the occupant, in an emergency state, the seat belt retractor 3 locks the seat belt 4 so that the seat belt 4 is not withdrawable and restrains the occupant. Similarly to a typical seat belt retractor, the seat belt retractor 3 of the present example locks the seat belt 4 so that the seat belt 4 is not withdrawable also when the seat belt 4 is withdrawn at a belt withdrawing speed significantly higher than a normal belt withdrawing speed. Although it is not illustrated, the seat belt retractor 3 may include a pretensioner and an energy absorbing (EA) mechanism. The pretensioner and the EA mechanism may be omitted from the seat belt retractor 3.

View (A) of FIG. 2 is a front view illustrating an example of an embodiment of the tongue according to the present invention used in the seat belt device of the present example, view (B) of FIG. 2 is a sectional view taken along line IIB-IIB in view (A) of FIG. 2, and view (C) of FIG. 2 is a rear view of the tongue illustrated in view (A) of FIG. 2.

As illustrated in views (A) and (C) of FIG. 2, the tongue 7 of the present example includes a grip portion 11 and an engagement portion 12. The occupant holds the grip portion 11 when bringing the tongue 7 into engagement with the buckle 8. The engagement portion 12 is to be inserted into and engaged with the buckle 8. The tongue 7 includes a T-shaped metal plat 13. Part of the metal plate 13 forms the engagement portion 12 and another part of the metal plate 13 forms a part corresponding to the grip portion 11. The part of the metal plate 13 corresponding to the grip portion 11 is partly coated with resin, thereby a resin molded portion 14 is formed. The engagement portion 12 of the metal plate 13 has a rectangular engagement hole 15 engageable with the buckle 8.

The grip portion 11 has a seat belt insertion hole 16 through which the seat belt 4 is inserted. The seat belt insertion hole 16 is elongated in a direction perpendicular to or substantially perpendicular to the engagement portion 12 and has a substantially V-shaped cross-section. In this case, a side edge 16a on the engagement portion 12 side in the longitudinal direction of the seat belt insertion hole 16 is formed of resin, and part of a side edge 16b, which is located on a side opposite to the engagement portion 12 side in the longitudinal direction of the seat belt insertion hole 16, is formed of resin and the other part of the side edge 16b is formed of the metal plate 13. The metal plate 13, which forms the side edge of the seat belt insertion hole 16, forms a seat belt slide portion 17. The seat belt 4 slides against the seat belt slide portion 17.

As illustrated in views (A) and (B) of FIG. 3, the seat belt slide portion 17 has a seat belt slide surface 18. The seat belt slide surface 18 has a substantially semi-circular arc shaped smooth curved surface in the cross section thereof perpendicular to the longitudinal direction of the seat belt insertion hole 16. The seat belt slide surface 18 of the seat belt slide portion 17 has a first recess portion 19 and a second recess portion 20. The sizes and shapes of these two recess portions are the same as each other. The cross sections, which are perpendicular to the longitudinal direction of the seat belt insertion hole 16, of outer circumferential surfaces 21 of the first and second recess portions 19 and 20 (bottom surfaces of the recess portions) also have arc shapes concentric with the arc of the seat belt slide surface 18 of the seat belt slide portion 17. That is, the cross sections of the first and second recess portions 19 and 20 perpendicular to or substantially perpendicular to the seat belt insertion hole 16 have the arc shapes, and the first and second recess portions 19 and 20 have rectangular shapes in the seat belt insertion hole 16 direction. The first and second recess portions 19 and 20 are arranged in the seat belt insertion hole 16 direction. Alternatively, either or both of the shapes and sizes of the first and second recess portions 19 and 20 may be different from each other.

With the first and second recess portions 19 and 20 arranged, there are the following surfaces in the seat belt slide surface 18: a shoulder belt-side seat belt slide surface 22 that is disposed on the shoulder belt 9 side and extends in the longitudinal direction of the seat belt insertion hole 16 (left-right direction in views (A) and (B) in FIG. 3); a lap belt-side seat belt slide surface 23 that is disposed on the lap belt 10 side and extends in the longitudinal direction of the seat belt insertion hole 16; an intermediate seat belt slide surface 24 that is disposed between the shoulder belt-side seat belt slide surface 22 and the lap belt-side seat belt slide surface 23 and between the first and second recess portions 19 and 20 and extends in a direction perpendicular to the longitudinal direction of the seat belt insertion hole 16; a first-end seat belt slide surface 25 that is disposed on a side opposite to the intermediate seat belt slide surface 24 relative to the first recess portion 19 between the shoulder belt-side seat belt slide surface 22 and the lap belt-side seat belt slide surface 23 and extends in the direction perpendicular to the longitudinal direction of the seat belt insertion hole 16; and a second-end seat belt slide surface 26 that is disposed on a side opposite to the intermediate seat belt slide surface 24 relative to the second recess portion 20 between the shoulder belt-side seat belt slide surface 22 and the lap belt-side seat belt slide surface 23 and extends in the direction perpendicular to the longitudinal direction of the seat belt insertion hole 16.

The first and second recess portions 19 and 20 have respective specified numbers of projections 27, which have dot shapes and are separated from one another. In this case, these projections 27 of the present example are arranged in five columns in a first direction and three rows in a second direction. The first direction is perpendicular to or substantially perpendicular to the longitudinal direction of the seat belt insertion hole 16 (up-down direction in views (A) and (B) of FIG. 3). The second direction is the longitudinal direction of the seat belt insertion hole 16 (left-right direction in views (A) and (B) of FIG. 3). The numbers of the projections 27 arranged in the first and second directions are not limited to the illustrated example and may be arbitrarily set.

Figure 4:
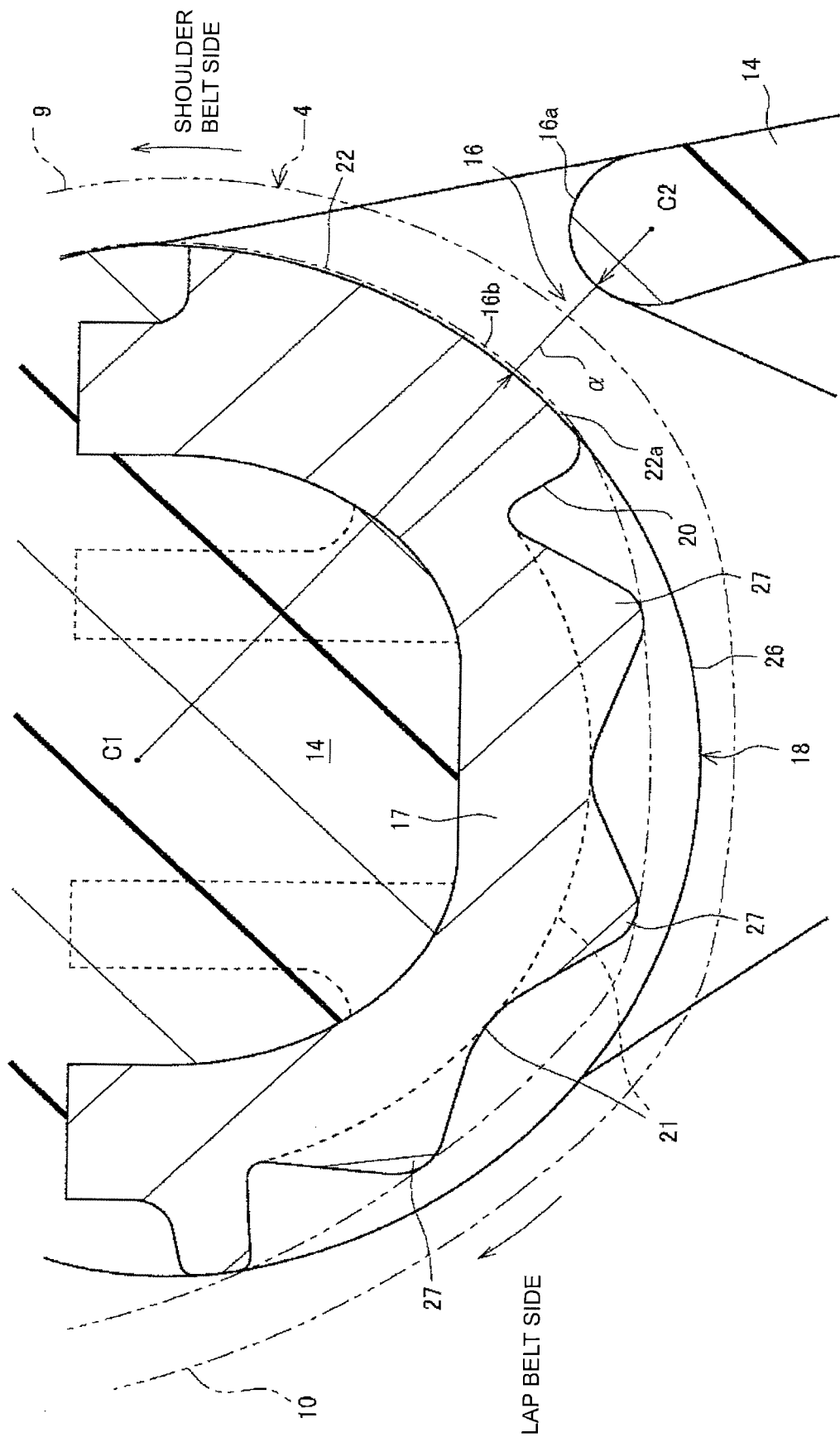
[FIG. 4]

As illustrated in FIG. 4, the projections 27 in the first and second recess portions 19 and 20 have conical or substantially conical shapes, the sizes of which are the same or substantially the same as one another. In this case, the vertex (tip end) of each of the projections 27 has a substantially spherical shape (arc shape in section) and is positioned on the inner side in the first recess portion 19 and the second recess portion 20 relative to the seat belt slide surface 18 of the seat belt slide portion 17. That is, the projections 27 do not project further to the outside than the seat belt slide surface 18 from the first and second recess portions 19 and 20.

The width of the shoulder belt-side seat belt slide surface 22 (length in the direction perpendicular to the longitudinal direction of the seat belt insertion hole 16) is significantly greater than the width of the lap belt-side seat belt slide surface 23 on the lap belt 10 side. Furthermore, the shoulder belt-side seat belt slide surface 22 opposes the side edge 16a on the engagement portion 12 side of the seat belt insertion hole 16. The side edge 16a has a substantially semi-circular arc shaped smooth curved surface in the cross section thereof perpendicular to the longitudinal direction of the seat belt insertion hole 16. Relative to a virtual line (normal line) $\alpha$, which connects a center C1 of the arc of the shoulder belt-side seat belt slide surface 22 (that is, the center of the arc of the seat belt slide surface 18) and a center C2 of the arc of the side edge 16a, the shoulder belt-side seat belt slide surface 22 extends from the shoulder belt 9 side to the lap belt 10 side through a virtual line $\alpha$. In other words, relative to a position where the distance between the shoulder belt-side seat belt slide surface 22 and the side edge 16a is a minimum (that is, the distance in the direction perpendicular to or substantially perpendicular to the longitudinal direction of the seat belt insertion hole 16 is a minimum), the shoulder belt-side seat belt slide surface 22 extends from the shoulder belt 9 side to the lap belt 10 side, and a part 22a of the shoulder belt-side seat belt slide surface 22 is positioned on the lap belt 10 side relative to the above-described position where the distance is a minimum.

Thus, the first and second recess portions 19 and 20 are not positioned in a part where the width of the seat belt insertion hole 16 is a minimum (part on the virtual line $\alpha$; the length in the direction perpendicular to the seat belt insertion hole 16 is a minimum). In this part where the width of the seat belt insertion hole 16 is a minimum, the shoulder belt-side seat belt slide surface 22 having a smooth curved surface and the side edge 16a having a smooth curved surface oppose each other.

In the tongue 7 of the present example having a structure as described above, when the seat belt 4 is not worn, the seat belt 4 is in contact with the shoulder belt-side seat belt slide surface 22, which is a smooth curved surface on the shoulder belt 9 side, and the side edge 16a, which is also a smooth curved surface, in a substantially non-pressure state while being in little contact with the projections 27 and the bottom portions 21 of the first and second recess portions 19 and 20. In this state, the seat belt 4 passes through the smooth minimum-width part of the seat belt insertion hole 16 where the first and second recess portions 19 and 20 are not provided. Thus, the seat belt 4 is unlikely to be inverted and is held in a state in which the seat belt 4 is not twisted.

In this state, in order to wear the seat belt 4, the occupant withdraws the seat belt 4 from the seat belt retractor 3 and holds the grip portion 11 of the tongue 7 so as to cause the tongue 7 to slide against the seat belt 4, and after that, cause the tongue 7 to be engaged with the buckle 8. In this case, since the seat belt 4 is held in the state in which the seat belt 4 is not twisted, the tongue 7 smoothly slides against the seat belt 4. Part of the seat belt 4 having been excessively withdrawn is retracted by the seat belt retractor 3. Thus, the seat belt 4 is worn by the occupant.

In the above-described state in which the seat belt is worn, the seat belt 4 is subjected to a small load caused by a retracting force of a return spring (not illustrated) of the seat belt retractor 3. Thus, the seat belt 4 is in contact with some or all of the following surfaces: the shoulder belt-side seat belt slide surface 22; the lap belt-side seat belt slide surface 23; the intermediate seat belt slide surface 24; the first-end seat belt slide surface 25; and the second-end seat belt slide surface 26. However, the seat belt 4 is in little contact with the bottom portions 21 of the first and second recess portions 19 and 20 and is not in contact with the projections 27 or is in contact with the projections 27 with a small force applied thereto. Thus, when the occupant moves by a specified amount in order to perform some operation while wearing the seat belt, the occupant can smoothly move due to comparatively smooth sliding of the seat belt 4 against the tongue 7.

When the emergency state is entered while the occupant wears the seat belt 4, the seat belt retractor 3 locks the seat belt 4 so that the seat belt 4 is not retractable. Consequently, the seat belt 4 is subjected to a large load by an inertial force of the occupant, and accordingly, large tension is applied to the seat belt 4. As a result, the seat belt 4 is moved into the first and second recess portions 19 and 20 as indicated by a dot-dot-dash line in FIG. 4. Thus, the projections 27 opposite the seat belt 4 are pushed into the seat belt 4. Thus, when the seat belt 4 attempts to extend to the lap belt 10 side, the movement of the seat belt 4 to the lap belt 10 side is effectively suppressed by a gripping force (frictional force) applied by the projections 27 to the seat belt 4. That is, extension of the lap belt 10 is effectively suppressed, thereby increasing the effectiveness of restraint of the occupant with the lap belt 10 in the emergency state.

In the tongue 7 of the present example, the seat belt slide surface 18 has the first and second recess portions 19 and 20, and a specified numbers of the substantially conical projections 27 are provided in each of the first and second recess portions 19 and 20. Thus, the tension applied to the seat belt 4 in the normal state is small, and accordingly, the seat belt 4 slides practically against the seat belt slide surface 18 at this time. This permits the seat belt 4 to smoothly slide against the tongue 7. As a result, operability of the seat belt 4 in the normal state can be effectively improved. Furthermore, the tension applied to the seat belt 4 is significantly increased in the emergency state. In this state, the seat belt 4 is moved into the first and second recess portions 19 and 20, and the projections 27 are pushed into the seat belt 4. Thus, when the seat belt 4 attempts to extend to the lap belt 10 side, the movement of the seat belt 4 to the lap belt 10 side can be effectively suppressed by the gripping force (frictional force) applied by the projections 27 to the seat belt 4. As a result, extension of the lap belt 10 in the emergency state is effectively suppressed, and accordingly, the effectiveness of restraint of the occupant with the lap belt 10 can be increased.

In particular, a cross section, which is perpendicular to or substantially perpendicular to the longitudinal direction of the seat belt insertion hole 16, of an outer circumferential surface of each of the first and second recess portions 19 and 20 provided in the seat belt slide surface 18 has an arc shape. In the normal state, this can increase the effectiveness of facilitating smooth sliding of the seat belt 4 against the tongue 7, and in the emergency state, the effectiveness of restraint of the occupant with the lap belt 10 can be increased.

Furthermore, relative to the position where the distance in the direction perpendicular to or substantially perpendicular to the longitudinal direction of the seat belt insertion hole 16 is a minimum, the shoulder belt-side seat belt slide surface 22 disposed in the longitudinal direction of the seat belt insertion hole 16 extends from the shoulder belt 9 side to the lap belt 10 side, and the part of the shoulder belt-side seat belt slide surface 22 is positioned on the lap belt 10 side relative to the above-described position where the distance is a minimum. Thus, even with the first and second recess portions 19 and 20 provided in the seat belt slide surface 18, the seat belt 4 can pass through the smooth minimum width part of the seat belt insertion hole 16 where the first and second recess portions 19 and 20 are not provided. Thus, the seat belt 4 is unlikely to be inverted and can be held in the state in which the seat belt 4 is not twisted. This permits the seat belt 4 to easily and smoothly slide against the tongue 7 in the normal state, and accordingly, operability of the seat belt 4 in the normal state can be further improved.

Furthermore, the seat belt slide surface 18 has the first and second-end seat belt slide surfaces 25 and 26 that are disposed at both the end portions in the longitudinal direction of the seat belt insertion hole 16 and extends in the direction perpendicular to or substantially perpendicular to the longitudinal direction of the seat belt insertion hole 16. Furthermore, the seat belt slide surface 18 has the plurality of recess portions, that is, the first and second recess portions 19 and 20, and the intermediate seat belt slide surface 24 that is disposed between the first and second recess portions 19 and 20 and extends in the direction perpendicular or substantially perpendicular to the longitudinal direction of the seat belt insertion hole 16. This permits the seat belt 4 to easily and smoothly slide against the tongue 7 in the normal state, and accordingly, operability of the seat belt in the normal state can be further improved.

Furthermore, the projections 27 do not project further to the outside than the seat belt slide surface 18 from the first and second recess portions 19 and 20. Thus, in the normal state, the seat belt 4, which is not in contact with the projections 27 or is in contact with the projections 27 with a small force applied thereto, slides practically against the seat belt slide surface 18. This can increase the effectiveness of facilitating smooth sliding of the seat belt 4 against the tongue 7. Furthermore, in the emergency state, the seat belt 4 is moved into the first and second recess portions 19 and 20, and accordingly, the projections 27 are pushed into the seat belt 4. Thus, when the seat belt 4 attempts to extend to the lap belt 10 side, the movement of the seat belt 4 to the lap belt 10 side can be effectively suppressed by the gripping force (frictional force) applied by the projections 27 to the seat belt 4. Thus, extension of the lap belt 10 in the emergency state is effectively suppressed, and accordingly, the effectiveness of the restraint of the occupant with the lap belt 10 can be increased.

Furthermore, since the tip ends of the projections 27 have a spherical shape, the seat belt 4 can have a strength with which comparatively larger forces applied to the seat belt 4 from the projections 27 in the emergency state can be support.

In the seat belt device 1 of the present example that uses the tongue 7 of the present example, the seat belt 4 can be smoothly and easily slide against the tongue 7 in the normal state, and extension of the lap belt 10 in the emergency state can be effectively suppressed. Furthermore, the strength of the seat belt 4 can be maintained at the strength with which the forces applied from the projections 27 can be supported in the emergency state. Thus, both the wearing property of the seat belt 4 for the occupant and the performance of the seat belt 4 for restraining the occupant can be further improved.

Although two recess portions, that is, the first and second recess portions 19 and 20 are provided in the seat belt slide surface 18 of the seat belt slide portion 17 in the aforementioned examples, one or any number more than one may be specified as the number of recess portions. Although the resin molded portion 14 is provided in the aforementioned example, the resin molded portion 14 may be omitted from the tongue according to the present invention. In short, various design changes are possible for the tongue according to the present invention within the scope described in the claims.

Industrial Applicability

The tongue and the seat belt device according to the present invention can be preferably used for a tongue slidably supported by a seat belt and engaged with a buckle of a seat belt device, which is equipped in a vehicle such as an automobile and restrains the occupant with the seat belt, and for the seat belt device equipped with the tongue.

The invention claimed is:

1. A tongue that is slidably supported by a seat belt, separates the seat belt into a shoulder belt and a lap belt, and has an engagement portion engageable with a buckle, the tongue has
    a seat belt insertion hole that is provided so as to be elongated in a direction perpendicular to or substantially perpendicular to the engagement portion and allows the seat belt to be inserted therethrough; and
    a seat belt slide portion that forms part of the seat belt insertion hole and has a seat belt slide surface against which the seat belt slides,
    wherein the seat belt slide portion has a specified number of recess portions provided in the seat belt slide surface, and a specified number of projections are separately provided in the recess portions,
    wherein the seat belt slide surface at least has a shoulder belt-side seat belt slide surface that is disposed on a shoulder belt side and extends continuously between both ends of the seat belt insertion hole in a longitudinal direction of the seat belt insertion hole, and
    wherein, relative to a position where the distance between the shoulder belt-side seat belt slide surface and an edge of the engagement portion forming a boundary of the insertion hole in a direction perpendicular to or substantially perpendicular to the longitudinal direction of the seat belt insertion hole is a minimum distance, the shoulder belt-side seat belt slide surface extends from the shoulder belt side to a lap belt side, and part of the shoulder belt-side seat belt slide surface is positioned on the lap belt side relative to the position where the distance is the minimum.

2. The tongue according to claim 1, wherein a cross section, which is perpendicular to or substantially perpendicular to the longitudinal direction of the seat belt insertion hole, of an outer circumferential surface of each of the recess portions has an arc shape.

3. The tongue according to claim 1, wherein the seat belt slide surface has a lap belt-side seat belt slide surface that is disposed on the lap belt side and extends in the longitudinal direction of the seat belt insertion hole.

4. The tongue according to claim 1, wherein, the seat belt slide surface has a first and second-end seat belt slide surfaces that is disposed at both end portions in the longitudinal direction of the seat belt insertion hole and extend in the direction perpendicular to or substantially perpendicular to the longitudinal direction of the seat belt insertion hole.

5. The tongue according to claim 4,
    wherein a plurality of the recess portions are provided, and
    wherein, the seat belt slide surface has an intermediate seat belt slide surface that is disposed between the plurality of recess portions and extends in the direction perpendicular to or substantially perpendicular to the longitudinal direction of the seat belt insertion hole.

6. The tongue according to claim 1, wherein, the projections do not project further to an outside than the seat belt slide surface from the recess portions.

7. The tongue according to claim 6, wherein each of the projections has a substantially spherically shaped tip end.

8. A seat belt device at least comprising:
a seat belt;
a seat belt retractor that retracts the seat belt;
a tongue slidably supported by the seat belt; and
a buckle, into which the tongue is inserted and with which the tongue is engaged,
wherein the seat belt is worn by an occupant when the tongue is inserted into and engaged with the buckle, and
wherein the tongue is according to claim 1.

9. A tongue that is slidably supported by a seat belt, separates the seat belt into a shoulder belt and a lap belt, and has an engagement portion engageable with a buckle, the tongue has a seat belt insertion hole that is provided so as to be elongated in a direction perpendicular to or substantially perpendicular to the engagement portion and allows the seat belt to be inserted therethrough; and
   a seat belt slide portion that forms part of the seat belt insertion hole and has a seat belt slide surface against which the seat belt slides,
   wherein the seat belt slide portion has a specified number of recess portions provided in the seat belt slide surface, and a specified number of projections are separately provided in the recess portions,
   wherein the seat belt slide surface at least has a shoulder belt-side seat belt slide surface that is disposed on a shoulder belt side and extends in a longitudinal direction of the seat belt insertion hole, and
   wherein, relative to a position where the distance between the shoulder belt-side seat belt slide surface and an edge of the engagement portion forming a boundary of the insertion hole in a direction perpendicular to or substantially perpendicular to the longitudinal direction of the seat belt insertion hole is a minimum distance, the shoulder belt-side seat belt slide surface extends from the shoulder belt side to a lap belt side, and part of the shoulder belt-side seat belt slide surface is positioned on the lap belt side relative to the position where the distance is the minimum,
   wherein, the seat belt slide surface has a first and second-end seat belt slide surfaces that is disposed at both end portions in the longitudinal direction of the seat belt insertion hole and extend in the direction perpendicular to or substantially perpendicular to the longitudinal direction of the seat belt insertion hole,
   wherein a plurality of the recess portions are provided, and
   wherein, the seat belt slide surface has an intermediate seat belt slide surface that is disposed between the plurality of recess portions and extends in the direction perpendicular to or substantially perpendicular to the longitudinal direction of the seat belt insertion hole.

* * * * *